Nov. 7, 1939.  H. ALLEN  2,179,003
LIQUID PRESSURE ADJUSTABLE RELIEF VALVE
Filed July 2, 1937  2 Sheets-Sheet 1
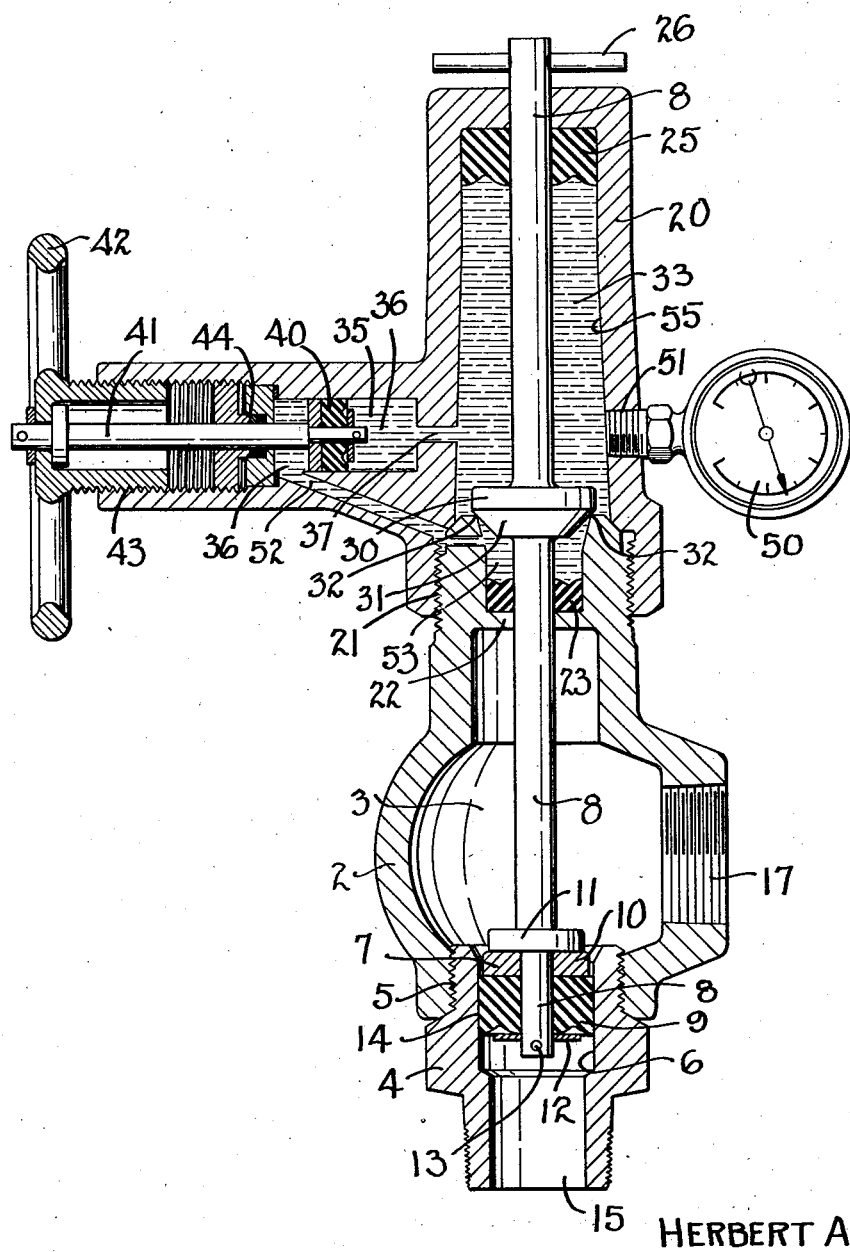
HERBERT ALLEN.
INVENTOR
BY Jesse R Stone
Lester B Clark
ATTORNEYS.

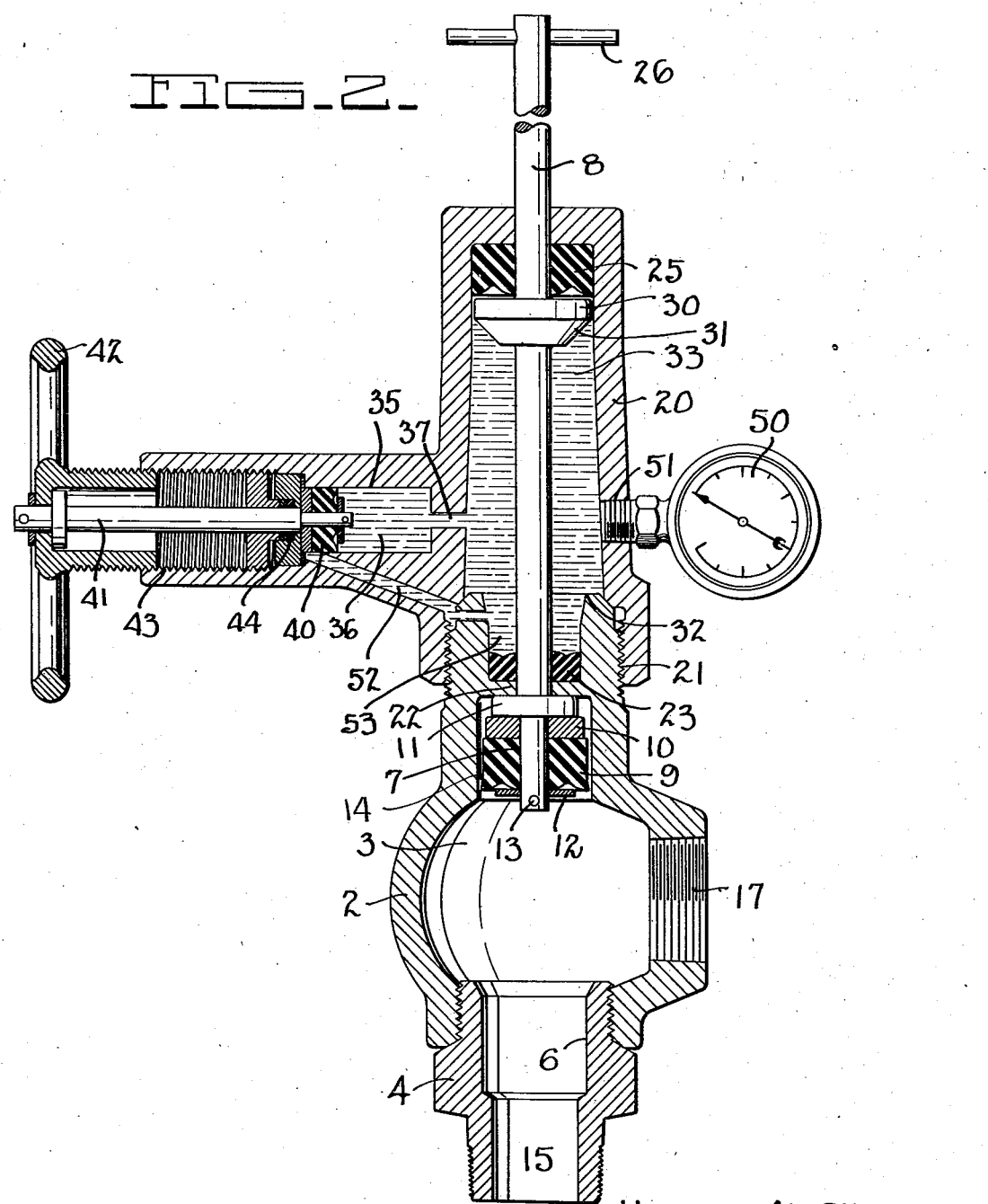

Patented Nov. 7, 1939

2,179,003

UNITED STATES PATENT OFFICE 2,179,003

LIQUID PRESSURE ADJUSTABLE RELIEF VALVE

Herbert Allen, Houston, Tex., assignor to Abercrombie Pump Company, a corporation of Texas Application July 2, 1937, Serial No. 151,657

8 Claims. (Cl. 137—53)

The invention relates to an adjustable liquid pressure relief valve wherein relief or opening of the valve is due to the fact that an hydraulic pressure applied to hold the valve in closed position is exceeded.

It is one of the objects of the invention to provide a relief valve wherein the valve member is held in closed position by applying a liquid pressure thereto in such a manner that when the liquid pressure is exceeded the valve will be permitted to move ever so slightly so as to release the liquid trapped in position and in this manner the valve will be released.

It is another object of the invention to provide a relief valve wherein the liquid tending to hold the valve in closed position acts to damp the movement of the valve member upon release.

Still another object of the invention is to provide an hydraulic relief valve wherein the pressure which must be exceeded in order to release the valve member can be adjusted.

Other and further objects of the invention will be readily apparent when the following description is considered in connection with the accompanying drawings wherein:

Fig. 1 is a vertical sectional view of the construction showing the valve member in closed position.

Fig. 2 is a view similar to Fig. 1, but showing the valve member in open position.

In Fig. 1 the valve housing is indicated generally at 2 and is formed to create an enlarged chamber 3 therein. A nipple 4 is threaded at 5 into the end of this housing and this nipple 4 has a cylindrical area 6 therein which receives the valve member indicated generally at 7. This valve member is of peculiar construction in that the stem 8 supports a resilient packing 9 which bears against a support ring 10, which is in turn held in position by the flange 11 on the stem 8. A washer 12 is held against the packing 9 by a cross pin 13. The periphery 14 of packing member 9 forms a seal with the cylinder 6, but the packing is of such a resilient nature that when pressure is applied to the exposed face thereof it will be transmitted to the stem 8 and when a predetermined pressure is exceeded the stem 8 will move a predetermined amount so as to effect release of the valve. When the valve is released the stem 8 will make an additional movement which will tend to pull the packing member 9 with the stem and cause it to move into the chamber 3 so as to release the pressure occurring in the inlet 15. As the valve member moves out of the cylinder 6 the pressure in the passage 15 will be relieved so that the fluid may discharge from the port 17.

The specific construction of this valve member is disclosed in my Patent No. 2,071,375, granted February 23, 1937.

In order to hold the valve member 7 in position with a predetermined pressure the pressure cylinder or housing 20 is threaded at 21 onto the end of the housing 2. A flange 22 in the housing 2 has an opening through which the stem 8 of the valve member may pass and a lip type packing 23 is disposed about the stem and abuts against the flange and faces away from the flange so that fluid pressure in the housing or cylinder 20 will be exerted on this packing to form a seal about the stem 8.

A similar lip type packing 25 is disposed about the stem at the outer end of the housing 20 so as to form a seal therewith. A handle 26 is affixed to the stem 8 to assist in its manipulation.

In order to hold the valve member in closed position a valve member 30 is fixed thereon and is provided with a beveled face 31 which is arranged to engage the seat 32 which is formed on the end of the housing 2. This will be a metal to metal seat so that there can be no flow of fluid from the chamber 33 past the valve member 30. In order that fluid pressure may be applied in the chamber 33 and against the valve member 30 a storage cylinder 35 is formed on the housing 20. This cylinder has a chamber 36 therein and an inlet 37 leading into the chamber 33. A piston 40 in the chamber is movable to force liquid from the chamber 36 into the chamber 33. This piston 40 is manipulated by a stem 41 and a handwheel 42, which is threaded at 43 into the housing 35. A suitable stuffing box 44 prevents leakage of fluid from the housing 35.

A pressure gauge 50 is threaded at 51 into the housing 20 so that the pressure in the chamber 33 will be registered on this gauge. A bypass 52 leads from the chamber 36 behind the piston 40 into the cylinder portion 53 in the end of the housing 2 below the seat 32, so that when the parts are being moved the pressure will be equalized and any displacement of liquid can be accommodated.

Particular attention is directed to the fact that the valve member 30 is of somewhat the same diameter as the inside of the chamber 33 and that the chamber 33 has a tapered configuration as illustrated at 55 so that as the valve member moves upwardly to the position shown in Fig. 2 it will move gradually into the reduced portion of the chamber 33. This construction is provided so that the liquid being displaced around the valve member 30 as it moves upwardly will be restricted in its flow as the valve member approaches the smaller diameter of the cylinder. A dashpot effect is thus maintained to gradually slow down the movement of the valve member and the valve member as a whole, so that displacement of the liquid is used to absorb the shock of the opening of the valve member. The sealing ring 25 acts as a cushion to gradually bring the valve member to rest when the valve member 30 reaches its outermost position.

In operation the parts will be assembled as seen in Fig. 1 and by manipulation of the handwheel 42 and movement of the piston 40 any desired pressure may be applied to the liquid to force it into the chamber 33. This pressure will be registered upon the gauge 50 and the valve may be set to any desired pressure which it is intended to withstand and beyond which it will release the valve.

When the pressure in the chamber 33 is set for a predetermined amount there can be no leakage past the seat 32 and the valve member will be held in closed position at this predetermined pressure.

When, however, the pressure on the valve member 7 exceeds this predetermined pressure, of course, there will be some yielding of the parts, such as the metal in the housing 20, and there will be some movement of liquid into the gauge 50 so that while of course the liquid is noncompressible there will be a very slight amount of movement permitted due to an increase in pressure on the valve member. This movement as just explained may be due to the flow of some of the liquid into the gauge or additional stressing of the metal parts. In any event there will be a slight movement of the seal member 30 from its seat 32. This slight amount of movement will allow a very slight amount of leakage past the seat 32. Theoretically, of course, if just one drop of liquid leaks by the seat 32 then the entire pressure in the pressure chamber will be released. Because the liquid is noncompressible release of this pressure allows the stem to move due to movement of the seal member 30 and the valve will in this manner be released.

As the valve member or seal member 30 moves upwardly in the chamber the liquid therein will be displaced around this valve member and it will gradually be brought to rest in the position shown in Fig. 2. The liquid which passes the seat 32 will, of course, flow through the bypass 52 and in this manner there will be sufficient compensation for displacement of the liquid. When the device is to be reseated the handle 26 may be manipulated and the valve and seal member moved into the cylinder 6. The handwheel 42 can then be moved to apply any desired pressure.

Broadly the invention contemplates a relief valve which is held in position by applying hydraulic pressure thereto and which pressure may be adjusted to any desired amount.

What is claimed is:

1. A relief valve of the character described comprising a housing, inlet means to connect said housing to a pressure line, a chamber in said housing, a valve member closing said inlet, a discharge opening from said chamber, a stem on said valve member, a pressure chamber also in said housing and through which said stem passes, sealing means about said stem at each end of said pressure chamber, a seat in said pressure chamber, a sealing member on said stem to seal said seat, and means to adjustably apply liquid pressure against said member to hold it on said seat whereby release of said liquid past said seat releases said sealing member, stem and valve member so that the pressure fluid may flow through said housing and discharge from said discharge opening.

2. A relief valve including a housing, a cylinder therein, a sealing packing having its periphery in engagement with said cylinder, a stem carried by said packing and movable upon flexing of said packing under pressure so that a predetermined movement of said stem tends to pull said packing from said cylinder, an hydraulic cylinder on said housing, a valve seal member on said stem to close said hydraulic cylinder, and means to apply liquid pressure to said hydraulic cylinder to retain said stem against movement so long as the parts are not stressed to allow leakage past said valve member.

3. An attachment for fluid pressure relief valves comprising a stem for said valve, a housing about said stem, means to apply liquid pressure to said housing to a predetermined extent, a seal member on said stem to be held in seated position against a seat in said housing by such predetermined pressure and an outlet beyond said seat to bypass liquid behind said means so as to maintain the system filled with liquid.

4. An attachment for fluid pressure relief valves comprising a stem for said valves, a housing about said stem, means to apply liquid pressure to said housing to a predetermined extent, a seal member on said stem to be held in seated position against a seat in said housing by such predetermined pressure, said means including a storage cylinder in communication with said housing, a by-pass on the low pressure side of said seal member to said cylinder and a piston movable in said storage cylinder.

5. An attachment for fluid pressure relief valves comprising a stem for said valves, a housing about said stem, means to apply liquid pressure to said housing to a predetermined extent, a seal member on said stem to be held in seated position against a seat in said housing by such predetermined pressure, a pressure gauge on said housing to yield against pressure so as to release said seal member when said predetermined set pressure is exceeded.

6. An attachment for fluid pressure relief valves comprising a stem for said valves, a housing about said stem, means to apply liquid pressure to said housing to a predetermined extent, a seal member on said stem to be held in seated position against a seat in said housing by such predetermined pressure, said housing being yieldable upon variation in the liquid pressure to unseat said member and release the liquid pressure.

7. An attachment for relief valves to control the releasing pressure comprising a housing, a means to apply liquid pressure thereto, a relief valve stem extending through said housing, a valve member on said stem, a seat therefor, said member being held on said seat by the said liquid pressure, a pressure gauge on said housing, the inherent resiliency of the material of said housing and gauge allowing some movement of the liquid when the pressure thereon is exceeded by the tendency of said stem to move imperceptibly so that said valve member will allow a slight leakage past said seat to release said stem for full movement.

8. An attachment for relief valves to control the releasing pressure comprising a housing, means to apply liquid pressure thereto, a relief valve stem extending through said housing, a valve member on said stem, a seat therefor, said member being held on said seat by the said liquid pressure, a pressure gauge on said housing, the inherent resiliency of the material of said housing and gauge allowing some movement of the liquid when the pressure thereon is exceeded by the tendency of said stem to move imperceptibly so that said valve member will allow a slight leakage past said seat to release said stem for full movement, said housing being tapered for cooperation with said valve ring whereby movement of said valve member is damped by the restricted flow of liquid past said member.

HERBERT ALLEN.